US005753719A

United States Patent [19]

Beekman et al.

[11] Patent Number: 5,753,719
[45] Date of Patent: May 19, 1998

[54] PVC FOAM COMPOSITIONS

[75] Inventors: George F. Beekman, Westchester; Lionel R. Price, Cincinnati, both of Ohio

[73] Assignee: Morton International, Inc., Chicago, Ill.

[21] Appl. No.: 923,561

[22] Filed: Sep. 4, 1997

Related U.S. Application Data

[60] Division of Ser. No. 821,185, Mar. 19, 1997, Pat. No. 5,726,213, which is a continuation-in-part of Ser. No. 773,366, Dec. 26, 1996, abandoned.

[51] Int. Cl.[6] .................................................. C08J 9/00
[52] U.S. Cl. .................... 521/89; 521/79; 521/81; 521/93; 521/134; 521/145; 524/186; 524/261; 524/301; 524/306
[58] Field of Search ............... 521/79, 81, 89, 521/93, 134, 145; 524/186, 261, 301, 329

[56] References Cited

U.S. PATENT DOCUMENTS

| | | | |
|---|---|---|---|
| 3,706,679 | 12/1972 | Hopton et al. | 521/79 |
| 3,953,385 | 4/1976 | Dworkin et al. | 521/79 |
| 4,032,468 | 6/1977 | Treadwell et al. | 252/182 |
| 4,698,368 | 10/1987 | Miller | 521/93 |
| 4,977,193 | 12/1990 | Croce et al. | 521/85 |

*Primary Examiner*—Morton Foelak
*Attorney, Agent, or Firm*—Robert M. Didrick; Gerald K. White

[57] ABSTRACT

The density of rigid foamed articles made by the thermal decomposition of a blowing agent in a vinyl chloride polymer is reduced by the use of an organotin mercaptoalkylcarboxylate, alone, or in combination with an organotin halide or carboxylate which activate the blowing agent. Sulfides made from said organotin mercaptoalkylcarboxylate are also superior activators of the blowing agent.

9 Claims, No Drawings

PVC FOAM COMPOSITIONS

This is a divisional of application Ser. No. 08/821,185 filed on Mar. 19, 1997, now U.S. Pat. No. 5,726,213; which is a C-I-P of Ser. No. 08/773,366 filed Dec. 26, 1996, now abandoned.

BACKGROUND OF THE INVENTION

This invention relates to the preparation of cellular vinyl chloride polymers. It relates more particularly to combinations of certain organotin compounds which are superior activators for blowing agents employed in the preparation of cellular vinyl chloride polymers.

One important utility for vinyl chloride resins is in the preparation of rigid foamed articles. The articles are manufactured by known methods such as extrusion of a blend of the resin and additives with a suitable blowing agent and choosing the processing temperature such that it is above the decomposition temperature of the blowing agent. The bubbles of gas evolved by the blowing agent are entrapped within the molten resin, thereby forming a cellular structure that are commercially useful articles such as pipe, decorative molding and structural siding. Usually, the polymer is melted at a temperature between 150° and 200° C. and it is necessary to include a stabilizer in the formulation for the purpose of eliminating or at least minimizing the heat-induced discoloration of the vinyl chloride polymer which would otherwise occur at these temperatures. Also, when the decomposition temperature of the blowing agent is much above the processing temperature, activators are employed to hasten the decomposition of the blowing agent and/or lower the decomposition temperature. The combination of a blowing agent and an activator increases both the degree and the rate of blowing agent decomposition. The resultant larger volume of gas generated is derivatives, e.g., dibutyltin bis(tall oil fatty acid carboxylate) and dibutyltin bis (benzoate).

The tin mercaptides of the so-called reverse esters are also known to be good stabilizers for vinyl chloride polymers and good activators for the blowing agents. The reverse esters are so called because they are the products of the reaction between mercapto-alcohols and carboxylic acids instead of between alcohols and mercapto-carboxylic acids. The preparation of the esters and the corresponding tin mercaptides, e.g., dibutyltin bis-(mercaptoethyl laurate), and their use as stabilizers for vinyl chloride polymers are taught in U.S. Pat. No. 2,870,182, which is incorporated herein by reference. Sulfides made by the reaction between such a reverse ester, an organotin chloride, and an alkali metal sulfide in an alkaline aqueous solution and their use as stabilizers for vinyl chloride polymers are described in U.S. Pat. No. 4,062,881, which also is incorporated herein by reference. The sulfides, which may be described as a blend of the reaction products, are also good activators for the blowing agents. The structures of the sulfides, as taught by the '881 patent, are somewhat controversial because of a postulated equilibrium among them but they are believed to include bis[(monoorganotin)-bis(mercaptoalkylcarboxylate)] monosulfides and polysulfides, bis[(diorganotin)-mono (mercaptoalkylcarboxylate)] monosulfides and polysulfides, and products which arise during equilibrium reactions among said mono- and polysulfides. The chemical and patent literature contain numerous examples demonstrating that members of different classes of organotin compounds may react with one another under certain conditions to yield products containing one or more tin atoms wherein at least a portion of the tin atoms are bonded to different combinations of radicals than they were before being mixed together.

Dworkin et al teaches in U.S. Pat. No. 3,953,385 that organotin carboxylates provide only marginal improvement in the activation of a blowing agent when combined with the organotin mercaptocarboxylic acid esters described therein. In contrast to that teaching, we have found that a combination of organotin carboxylates and a blend of the organotin sulfides described above are unexpectedly good activators for the blowing agents as well as being excellent stabilizers for the vinyl chloride polymers. We have also found that organotin chlorides work well by themselves or in combination with organotin carboxylates as activators for the blowing agents such as the azobiscarbonamides, 5-phenyl tetrazole, and benzene sulfonylhydrazide.

SUMMARY OF THE INVENTION

It is an object of this invention to provide more effective activators for the blowing agents in the preparation of foamed vinyl chloride polymers.

It is another object of this invention to provide a method for reducing the density of foamed vinyl chloride polymers while also reducing the amount of blowing agent.

It is a further object of this invention to provide foamed poly(vinyl chloride) articles having reduced density and containing reduced amounts of the blowing agent by-products and the blowing agent activator.

These and other objects which will become apparent from the following description of the invention are achieved by a composition consisting essentially of:

a vinyl chloride polymer, a blowing agent, at least one stabilizer selected from the group consisting of:

(A) an organotin mercaptide of a mercaptoalkyl carboxylate having the formula:

$$R^1_{(4-y)}Sn[SR^2OC(=O)R^3]_y \qquad I$$

wherein $R^1$ is an alkyl radical having from 1 to 8 carbon atoms, $R^2$ is an alkylene radical having from 2 to 18 carbon atoms, $R^3$ is hydrogen, a hydrocarbyl radical, a hydroxyhydrocarbyl radical, or $R^4C(=O)OR^5$, wherein $R^4$ is $(CH_2)_p$, phenylene, or —CH=CH—, and $R^5$ is a hydrocarbyl radical, p is 0 or an integer from 1 to 8, and y is any number from 1 to 3; and (B) a sulfide of an organotin mercaptide of Formula I; and, optionally, at least one organotin salt having the formula:

$$R'_{(4-x)}SnX_x \qquad III$$

wherein R' is an alkyl radical having from 1 to 18 carbon atoms, X is halogen of atomic weight 35 to 127 or a carboxylate ion, and x is from 1 to 3.

The sulfide may be made by mixing an alkaline aqueous solution, a mercaptoalkyl carboxylate, an alkali metal sulfide or an alkaline earth metal sulfide, or ammonium sulfide, and an organotin halide having the formula:

$$R^6_{(4-z)}SnHal_z \qquad II$$

wherein $R^6$ is an alkyl group having from 1 to 18 carbon atoms, Hal is a halogen having an atomic weight of from 35 to 127, preferably chlorine, and z is any number from 1 to 3.

Alternatively, the sulfide may be made by mixing a monoalkyl- or dialkyltin sulfide with an organotin mercaptide of Formula I, and by other procedures well known in the stabilizer art. The sulfide is believed to include bis [monoorganotin)-bis(mercaptoalkylcarboxylate)] monosulfides and polysulfides, bis[(diorganotin)-mono (mercaptoalkylcarboxylate)]monosulfides and polysulfides, and products which arise during equilibrium reactions among said mono- and polysulfides, including monoalkyltin tris(mercaptoalkylcarboxylates), dialkyltin bis (mercaptoalkylcarboxylates, and oligomeric mono- and di-organotin mono- and polysulfides. The sulfide may be described further by the formula:

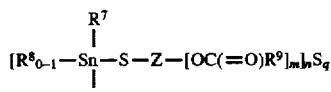
IV wherein $R^7$ is a hydrocarbyl radical; $R^8$ is a hydrocarbyl radical or —S—Z—[OC(=O)$R^9$]; Z is an alkylene or hydroxyalkylene radical of at least 2 carbon atoms; $R^9$ is hydrogen, a hydrocarbyl radical, a hydroxyhydrocarbyl radical, or $R^{10}C(=O)OR^{11}$, wherein $R^{10}$ is $(CH_2)_p$, phenylene, or —CH=CH—, and $R^{11}$ is a hydrocarbyl radical; m is an integer from 1 to 3, n is from 1 to 2, p is 0 or an integer from 1 to 8, q is from 1 to 10, and the valency of Z is m+1; with the proviso that it includes products arising from an equilibrium among the —Sn$R^7$, —Sn$R^8$, and —Sn—S—Z—[OC(=O)$R^9$] moieties, as recited above.

This invention does not include the use of an organotin (mercaptoalkylcarboxylate) sulfide containing more than 80% by weight of a (monoorganotin)-bis-(mercaptoalkylcarboxylate) sulfide as a blowing agent activator in a vinyl chloride polymer composition when an organotin salt of Formula III is not present in the composition.

DETAILED DESCRIPTION OF THE INVENTION

As used herein, a hydrocarbyl radical has from 1 to 20 carbon atoms and includes alkyl, cycloalkyl, aryl, arylene, alkaryl, aralkyl, aralkenyl, and alkenyl radicals having up to 3 ethylenic double bonds.

The vinyl chloride polymers are made from monomers consisting of vinyl chloride alone or a mixture of monomers comprising, preferably, at least about 70% by weight based on the total monomer weight of vinyl chloride. They are exemplified by copolymers of vinyl chloride with from about 1 to about 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride ((86:13:1), vinyl chloride-vinylidene chloride (95:5); vinyl chloride-diethyl fumarate (95:5), and vinyl chloride 2-ethylhexyl acrylate (80:20).

The vinyl chloride polymers, of course, constitute the major portion of the compositions of this invention. Thus, they amount to from about 70% to about 95% by weight of the total weight of the unfoamed compositions of this invention.

The blowing agent may be any one or a mixture of those commonly used for foaming PVC pipe, including azobisformamide, 5-phenyl tetrazole, benzene sulfonyl hydrazide. The formula for the azobisformamide is:

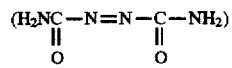

Azobisformamide is available under the CELOGEN AZRV trademark. The concentration of said blowing agent is suitably from about 0.1 and 5.0% but preferably from about 0.2 to about 3% by weight of the total composition prior to the formation of foam.

R' in the organotin salt is preferably an alkyl group having from 1 to 8 carbon atoms, more preferably only 1 carbon atom, and when X is halogen, it is preferably chlorine and x is preferably from 2 to 3. When used, the proportion of organotin halide in the unfoamed compositions of this invention is from about 5 to about 15% of the weight of the heat stabilizer used in the vinyl chloride polymer composition of this invention. When X is a carboxylate ion, it preferably has from 1 to 20 carbon atoms and is exemplified by the ions of acetic, propionic, butyric, caprylic, caproic, decanoic, lauric, stearic, oleic, and benzoic acid. When used, the amount of organotin carboxylate is from about 10 to about 80% of the weight of the heat stabilizer used in the vinyl chloride polymer composition of this invention.

The organotin halides may be prepared by methods well known in the art such as those disclosed in U.S. Pat. Nos. 3,745,183, 3,857,868, and 4,134,878. They are exemplified by methyltin trichloride, dimethyltin dichloride, trioctyltin chloride, dibutyltin dibromide, diphenyltin dichloride, and dibenzyltin dichloride.

The organotin carboxylates may be prepared by well known conventional methods such as by the reaction of an organotinhalide with a carboxylic acid in the presence of a base in water or the reaction of an organotin oxide with the carboxylic acid. They are exemplified by monobutyltin tris(dodecylmaleate), dimethyltin azelate, diethyltin dilaurate, monobutyltin tri-tallate, and dimethyltin dibenzoate.

The amount of stabilizer in the unfoamed compositions of this invention is from about 0.1 to about 10%, preferably from about 0.5 to about 5%, by weight. They may be incorporated into the compositions by admixing in an appropriate mill or mixer or by any of the other well-known methods which provide for the uniform distribution of the stabilizers throughout the composition.

In the stabilizer (A), $R^1$ is preferably an alkyl group having from 1 to 4 carbon atoms, $R^2$ is preferably an alkylene group having from 2 to 8 carbon atoms, $R^3$ is preferably an alkyl group having from 1 to 7 carbon atoms or a phenyl group, and y is preferably from 1 to 2. Reverse esters are commonly made from a mixture of monoorgano- and diorganotin chlorides; it is preferred for this invention to use a mixture containing from about 70 to about 90, more preferably about 80 weight percent of the dimethyltin chloride to promote the formation of a mixture of the reverse esters having about the same proportion of mono- and diorganotin bis(mercaptoalkylcarboxylates). Reverse esters having such a high concentration of the diorganotin moiety have been found to be superior activators of the blowing agent without the need for a second activator such as the organotin halides and organotin carboxylates. The stabilizer comprises, therefore, a mixture of mercaptides for some of which the value of y in Formula I is 2 and for others the value of y is 3. It is preferred, that the amount of mercaptides for which y is 2 is from about 70 to about 90%, more preferably about 80%, of the total weight of the mixture. As noted above, the preparation of the mercaptoalkyl carboxylate esters and the corresponding tin mercaptides, e.g., dibutyltin bis-(mercaptoethyl laurate), is taught in U.S. Pat. No. 2,870,182.

The sulfides may be prepared by any of several well known methods such as those taught in U.S. Pat. No. 4,062,881.

Thus as starting material there can be used methyltin trichloride, methyltin tribromide, methyltin triiodide, ethyltin trichloride, butyltin trichloride, butyltin tribromide, butyltin triiodide, sec. butyltin trichloride, octyltin trichloride, benzyltin trichloride, dimethyltin dichloride, dimethyltin dibromide dimethyltin diiodide, dipropyltin dichloride, butyl methyl tin dichloride, dibutyltin dichloride, dibutyltin dibromide, dioctyltin diiodide, dioctyltin dichloride, dibenzyltin dichloride, phenyltin trichloride, p-tolyltin trichloride, diphenyltin dichloride, di-p-tolyltin dichloride, cyclohexyltin trichloride, dicyclohexyltin dichloride, cyclopentyltin trichloride, oleyltin trichloride, dioleyltin dichloride, vinyltin trichloride, diallyltin dichloride, allyltin trichloride, eicosanyltin trichloride.

As the mercaptoalkanol ester there can be employed, for example, esters of mercaptoethanol, 2-thioglycerine, 3-thioglycerine, 3-thiopropanol, 2-thiopropanol, 4-thiobutanol, 18-thiooctadecanol, 9-thiononanol, 8-thiooctanol, 6-thiohexanol with acids such as formic acid, acetic acid, propionic acid, butyric acid, pivalic acid, valeric acid, caprylic acid, caproic acid, decanoic acid, lauric acid, myristic acid, palmitic acid, 2-ethylhexanoic acid, stearic acid, eicosanic acid, oleic acid, linoleic acid, linolenic acid, crotonic acid, methacrylic acid, acrylic acid, cinnamic acid, benzoic acid, p-toluic acid, o-toluic acid, p-t-butylbenzoic acid, enanthic acid, p-n-butylbenzoic acid, cyclohexane carboxylic acid, phenylacetic acid, ricinoleic acid, hydrogenated ricinoleic acid, phenylpropionic acid. Of course, mixtures of acids can be used, e.g., tall oil acids, palmitic acid-stearic acid mixtures ranging from 60:40 to 40:60, soybean oil acids, cottonseed oil acids, hydrogenated cottonseed oil acids, peanut oil acids, coconut oil acids, corn oil acids, castor oil acids, hydrogenated castor oil acids, lard acids, etc. Illustrative of half esters of polycarboxylic acids which can be esterified with the mercaptoalkanol are monomethyl maleate, monoethyl maleate, monopropyl maleate, monobutyl maleate, monooctyl maleate, mono-2-ethylhexyl maleate, monostearyl maleate, monoethyl fumarate, mono methyl oxalate, monoethyl oxalate, monoethyl malonate, monobutyl malonate, monoisopropyl succinate, monomethyl succinate, monomethyl glutarate, monoethyl adipate, monomethyl glutarate, monoethyl adipate, monomethyl azelate, monomethyl phthalate, monoethyl phthalate, monoisooctyl phthalate, monoethyl terephthalate.

Illustrate of mercapto esters which can be used in the preparation of the tin compound include:

2-mercaptoethyl acetate,
2-mercaptoethyl propionate,
2-mercaptoethyl butyrate,
2-mercaptoethyl valerate,
2-mercaptoethyl pivalate,
2-mercaptoethyl caproate,
2-mercaptoethyl caprylate,
2-mercaptoethyl pelargonate,
2-mercaptoethyl decanoate,
2-mercaptoethyl laurate,
2-mercaptoethyl stearate,
2-mercaptoethyl eicosanate,
2-mercaptoethyl palmitate,
2-mercaptoethyl oleate,
2-mercaptoethyl ricinoleate,
2-mercaptoethyl linoleate,
2-mercaptoethyl linolenate,
2-mercaptoethyl tallate,
2-mercaptoethyl ester of cottonseed oil acid,
2-mercaptoethyl ester of lard acids,
2-mercaptoethyl ester of coconut oil acids,
2-mercaptoethyl ester of soybean oil acids,
2-mercaptoethyl benzoate,
2-mercaptoethyl p-toluate,
2-mercaptoethyl crotonate,
2-mercaptoethyl cinnamate,
2-mercaptoethyl phenyl acetate,
2-mercaptoethyl phenyl propionate,
2-mercaptoethyl methyl maleate,
2-mercaptoethyl ethyl fumarate,
2-mercaptoethyl butyl oxalate,
2-mercaptoethyl methyl oxalate,
2-mercaptoethyl ethyl malonate,
2-mercaptoethyl methyl succinate,
2-mercaptoethyl methyl azelate,
2-mercaptoethyl hexyl azelate,
2-mercaptoethyl methyl phthalate,
3-mercaptopropyl pelargonate,
3-mercaptopropyl enanthate,
3-mercaptopropyl stearate,
3-mercaptopropyl oleate,
3-mercaptopropyl ricinoleate,
3-mercaptopropyl ethyl maleate,
3-mercaptopropyl benzoate,
6-mercaptohexyl acetate,
7-mercaptoheptyl acetate,
7-mercaptoheptyl propionate,
8-mercaptooctyl acetate,
8-mercaptooctyl enanthate,
18-mercaptooctadecyl acetate,
18-mercaptooctadecyl enanthate.

In Formula IV for the sulfide, $R^7$ and $R^8$ are preferably alkyl groups having from 1 to 8 carbon atoms, more preferably 1, Z is preferably an alkylene radical having from 2 to 8 carbon atoms, $R^9$ is preferably an alkyl radical having from 1 to 17 carbon atoms, n is preferably 1, and q is preferably from 1 to 4 and more preferably from 1 to 2.

In addition to the blowing agent activator-heat stabilizer compositions described in the foregoing specification and appended claims, the vinyl chloride polymer compositions of this invention may contain additives for the purpose of increasing, resistance to oxidation, flame retardancy and impact resistance of the polymer. Pigments, fillers, dyes, ultraviolet light absorbing agents and the like may also be present. Conventional processing aids such as lubricants and acrylic resins can also be present.

Acrylic resins are employed in the compositions of this invention as processing aids to improve melt elasticity and strength and to prevent the collapse of the cellular structure during processing. The amount of the acrylic resin is from about 2 to about 15 parts per hundred parts of the vinyl chloride polymer. The molecular weight of the resin may be in the range of from 300,000 to 1,500,000 but those having the higher molecular weights are preferred; resins having a molecular weight of 1,000,000 and higher are particularly preferred. Examples of the acrylic processing aids include those sold by Rohm & Haas under the trademark ACRYLOID and product numbers K-175, and K-400.

Among the antioxidants suitable for use in the present polymer compositions are phenols, particularly those wherein the positions adjacent to the carbon atom bearing the hydroxyl radical contain alkyl radicals as substituents. Phenols wherein this alkyl radical is sterically bulky, e.g. a tertiary butyl radical, are preferred.

A small amount, usually not more than 0.1%, of a metal release agent, such as an oxidized polyethylene, also can be included.

The effect of the blowing agent activator is independent of whether it is added to the vinyl chloride polymer as an aqueous solution, as part of a stabilizer package, or as part of a lubricant package. A variety of conventional molding and extruding techniques may be used to form the rigid, cellular vinyl chloride polymers of this invention into pipe or any desired profile or a sheet.

The following examples illustrate this invention more specifically. Unless otherwise indicated, all parts and percentages in these examples and throughout this specification are by weight. ABF is an abbreviation of azobisformamide.

EXAMPLE 1

PVC pipe formulations A and B were processed in a Brabender ¾ inch extruder having a 25/1 length to diameter ratio and a straight flight screw having a 2/1 compression ratio and a die orifice of 5 mm. The temperature profile (°C.) was:

Zone 1 170 Zone 2 180 Zone 3 190 Die 170.

Formulations A and B are the same except for the addition of the monomethyltin trichloride in B as shown in the following table. The extrusion results are also given in the table.

TABLE 1

| FORMULATION | A | B |
|---|---|---|
| PVC | 100.00 parts | 100.00 parts |
| CaCO₃ | 5.00 phr | 5.00 phr |
| TiO₂ | 1.00 phr | 1.00 phr |
| Ca stearate | 0.75 phr | 0.75 phr |
| AC-629* | 0.08 phr | 0.08 phr |
| Paraffin wax | 1.30 phr | 1.30 phr |
| Azobisformamide | 0.35 phr | 0.35 phr |
| Monomethyltin tris (mercapto-ethyl tallate) sulfide | 0.70 phr | 0.70 phr |
| Monomethyltin trichloride | 0.00 " | 0.05 " |
| Extrusion Results | | |
| RPM | 50 | 50 |
| Torque m · gm. | 2514 | 2512 |
| Rate gm/hr | 3400 | 3400 |
| Melt temperature (°C.) | 205 | 205 |
| Foam Density gm/cc | 0.74 | 0.70 |

*trademark for oxidized polyethylene

EXAMPLES 2–4

PVC pipe formulations 2–4, as well as Control 1 were processed in a Brabender ¾ inch extruder having a 25/1 length to diameter ratio and a straight flight screw having a 4/1 compression ratio and a die orifice of 5 mm. The temperature profile (°C.) was:

Zone 1 150 Zone 2 160 Zone 3 175 Die 170.

The formulations as well as the extrusion results are as shown in the following table.

TABLE 2

| FORMULATION** | Cont 1 | 2 | 3 | 4 |
|---|---|---|---|---|
| PVC | 100.00 | 100.00 | 100.00 | 100.00 |
| Acrylic resin | | | | |
| K-400 | 6.00 | 6.00 | 6.00 | 6.00 |
| K-175 | 0.50 | 0.50 | 0.50 | 0.50 |
| CaCO₃ | 5.00 | 5.00 | 5.00 | 5.00 |
| TiO₂ | 1.00 | 1.00 | 1.00 | 1.00 |
| Ca stearate | 1.00 | 1.00 | 1.00 | 1.00 |
| AC-629 | 0.1 | 0.1 | 0.10 | 0.10 |
| Paraffin wax | 0.50 | 0.50 | 0.50 | 0.50 |
| Azobisformamide | 0.15 | 0.15 | 0.15 | 0.15 |
| Monomethyltin tris (mercapto-ethyl tallate) sulfide | 1.50 | 1.50 | 1.50 | 1.50 |
| Monomethyltin trichloride | 0.00 | 0.40 | 0.20 | 0.20 |
| Extrusion Results | | | | |
| RPM | 45 | 45 | 45 | 45 |
| Torque m · gm. | 8650 | 7025 | 7950 | 7450 |
| Rate gm/min | 48.6 | 45.9 | 44.8 | 44.9 |
| Melt temp (°C.) | 215 | 215 | 212 | 211 |
| Foam Density gm/cc | 0.96 | 0.85 | 0.91 | 0.91 |

**amounts of additive in parts per hundred parts of resin (phr)

EXAMPLE 5, CONT 2, AND COMP EXAMPLES 1 and 2

The PVC pipe formulations shown in Table 3 were processed in a Brabender ¾ inch extruder having a 25/1 length to diameter ratio and a straight flight screw having a 4/1 compression ratio and a die orifice of 5 mm. The extrusion results are also given in the table. The temperature profile (°C.) was:

Zone 1 150 Zone 2 160 Zone 3 175 Die 170.

TABLE 3

| FORMULATION** | Cont 2 | CE 1 | 5 | CE2 |
|---|---|---|---|---|
| PVC | 100.00 | 100.00 | 100.00 | 100.00 |
| Acrylic resin | | | | |
| K-400 | 6.00 | 6.00 | 6.00 | 6.00 |
| K-175 | 0.50 | 0.50 | 0.50 | 0.50 |
| CaCO₃ | 5.00 | 5.00 | 5.00 | 5.00 |
| TiO₂ | 1.00 | 1.00 | 1.00 | 1.00 |
| Ca stearate | 1.00 | 1.00 | 1.00 | 1.00 |
| RHEOLUBE 165 | 0.50 | 0.50 | 0.50 | 0.50 |
| AC-629 | 0.1 | 0.1 | 0.10 | 0.10 |
| Azobisformamide | 0.15 | 0.15 | 0.15 | 0.15 |
| Dimethyltin bis (mercapto-ethyl tallate) sulfide | 1.50 | — | 1.20 | — |
| Dimethyltin bis (2-ethylhexyl thioglycolate) | — | 1.50 | — | 1.20 |
| Dimethyltin ditallate | — | — | 0.30 | 0.30 |
| Extrusion Results | | | | |
| RPM | 45 | 45 | 45 | 45 |
| Torque m · gm. | 8700 | 8150 | 7450 | 7900 |
| Rate gm/min | 44.6 | 42,8 | 44.4 | 43.3 |
| Melt temp (°C.) | 209 | 207 | 207 | 206 |
| Foam Denisity gm/cc | 0.56 | 0.74 | 0.46 | 0.63 |

**amounts of additive in parts per hundred parts of resin (phr)

EXAMPLES 6–8 & CONTROL 2 & COMP EX 3

The PVC pipe formulations shown in Table 4 were processed in a Brabender ¾ inch extruder having a 25/1 length to diameter ratio and a straight flight screw having a 4/1 compression ratio and a die orifice of 5 mm. The extrusion results are also given in the table. The temperature profile (°C.) was:

Zone 1 150 Zone 2 160 Zone 3 175 Die 170.

TABLE 4

| FORMULATION** | Cont 2 | CE 3 | 6 | 7 | 8 |
|---|---|---|---|---|---|
| PVC | 100 | 100 | 100 | 100 | 100 |
| Acrylic resin | | | | | |
| K-400 | 6 | 6 | 6 | 6 | 6 |
| K-175 | 0.5 | 0.5 | 0.5 | 0.5 | 0.5 |
| CaCO$_3$ | 5 | 5 | 5 | 5 | 5 |
| TiO$_2$ | 1 | 1 | 1 | 1 | 1 |
| Ca stearate | 1 | 1 | 1 | 1 | 1 |
| AC-629 | 0.1 | 0.1 | 0.1 | 0.1 | 0.1 |
| Paraffin wax | 0.5 | 0.5 | 0.5 | 0.5 | 0.5 |
| Azobisformamide | 0.35 | 0.35 | 0.35 | 0.35 | 0.35 |
| Dimethyltin bis (mercapto-ethyl tallate) sulfide | 1.50 | — | 1.20 | 0.90 | 0.60 |
| MARK 1915(Witco) | — | 1.50 | — | — | — |
| Dimethyltin ditallate | — | — | 0.30 | 0.60 | 0.90 |

TABLE 4-continued

| FORMULATION** | Cont 2 | CE 3 | 6 | 7 | 8 |
|---|---|---|---|---|---|
| Extrusion Results | | | | | |
| RPM | 45 | 45 | 45 | 45 | 45 |
| Torque m · gm. | 8700 | 6800 | 7450 | 6575 | 7900 |
| Rate gm/min | 44.1 | 46.8 | 43.4 | 43.9 | 43.3 |
| Melt temp (°C.) | 209 | 206 | 206 | 204 | 203 |
| Foam Density | 0.56 | 0.53 | 0.53 | 0.52 | 0.50 |

**amounts of additive in parts per hundred parts of resin (phr)

EXAMPLES 9–15 & CONTROL 2

The PVC pipe formulations shown in Table 5 were processed in a Brabender ¾ inch extruder having a 25/1 length to diameter ratio and a straight flight screw having a 4/1 compression ratio and a die orifice of 5 mm. The extrusion results are also given in the table. The temperature profile (°C.) was:

Zone 1 150 Zone 2 160 Zone 3 175 Die 170.

TABLE 5

| FORMULATION** | Cont 2 | 9 | 10 | 11 | 12 | 13 | 14 | 15 |
|---|---|---|---|---|---|---|---|---|
| PVC | 100 | 100 | 100 | 100 | 100 | 100 | 100 | 100 |
| Acrylic resin | | | | | | | | |
| K-400 | 6 | 6 | 6 | 6 | 6 | 6 | 6 | 6 |
| K-175 | 0.5 | 0.5 | 0.5 | 0.5 | 0.5 | 0.5 | 0.5 | 0.5 |
| CaCO$_3$ | 5 | 5 | 5 | 5 | 5 | 0.5 | 0.5 | 0.5 |
| TiO$_2$ | 1 | 1 | 1 | 1 | 1 | 1 | 1 | 1 |
| Ca stearate | 1 | 1 | 1 | 1 | 1 | 1 | 1 | 1 |
| AC-629 | 0.1 | 0.1 | 0.1 | 0.1 | 0.1 | 0.1 | 0.1 | 0.1 |
| Paraffin wax | 0.5 | 0.5 | 0.5 | 0.5 | 0.5 | 0.5 | 0.5 | 0.5 |
| Azobisformamide | 0.35 | 0.35 | 0.35 | 0.35 | 0.35 | 0.35 | 0.35 | 0.35 |
| Dimethyltin bis(mercapto-ethyltallate) sulfide | 1.50 | — | — | — | 1.20 | — | — | — |
| Monomethyltin tris(mercapto-ethyltallate) sulfide | — | 1.50 | — | — | — | 1.20 | — | — |
| Monomethyltin bis(mercapto-ethyltallate) | — | — | 1.50 | — | — | — | 1.20 | — |
| Dimethyltin (mercapto-ethyltallate) | — | — | — | 1.50 | — | — | — | 1.20 |
| Dimethyltin ditallate | — | — | — | — | 0.30 | 0.30 | 0.30 | 0.30 |
| Extrusion Results | | | | | | | | |
| RPM | 45 | 45 | 45 | 45 | 45 | 45 | 45 | 45 |
| Torque m.gm. | 8700 | 8625 | 8825 | 8200 | 7525 | 7900 | 7525 | 7225 |
| Rate gm/min | 44.1 | 46.0 | 46.9 | 46.1 | 43.8 | 44.3 | 44.8 | 44.0 |
| Melt temp(°C.) | 209 | 205 | 206 | 204 | 204 | 206 | 205 | 205 |
| Foam Density gm/cc | 0.56 | 0.63 | 0.55 | 0.51 | 0.52 | 0.58 | 0.55 | 0.49 |

**amounts of additive in parts per hundred parts of resin (phr)

The subject matter claimed is:
1. A composition consisting essentially of:
a vinyl chloride polymer, a blowing agent, at least one stabilizer selected from the group consisting of
(A) an organotin mercaptide of a mercaptoalkyl carboxylate having the formula:

$$R^1(4-y)Sn[SR^2OC(=O)R^3]_y$$    I wherein $R^1$ is an alkyl radical having from 1 to 8 carbon atoms, $R^2$ is an alkylene radical having from 2 to 18 carbon atoms, $R^3$ is hydrogen, a hydrocarbyl radical, a hydroxyhydrocarbyl radical, or $R^4C(=O)OR^5$, wherein $R^4$ is $(CH_2)_p$, phenylene, or —CH=CH—, and $R^5$ is a hydrocarbyl radical, p is 0 or an integer from 1 to 8, and y is any number from 1 to 3; and (B) a sulfide of an organomercaptide of Formula I; and, optionally, at least one organotin salt having the formula;

wherein R' is an alkyl radical having from 1 to 18 carbon atoms, X is a chloride ion or a carboxylate ion, and x is from 1 to 3; with the proviso that when such an organotin salt is not present in the composition, the composition is free from an organotin mercaptoalkylcarboxylate sulfide containing more than about 80% by weight of a monoorganotin bis-(mercaptoalkylcarboxylate)sulfide.

2. The composition of claim 1 wherein X is a carboxylate ion having from 1 to 20 carbon atoms and x is preferably from 2 to 3.

3. The composition of claim 1 wherein $R^1$ is an alkyl group having from 1 to 4 carbon atoms, $R^2$ is an alkylene group having from 2 to 8 carbon atoms, $R^3$ is an alkyl group having from 1 to 17 carbon atoms or a phenyl group, and y is from 2 to 3.

4. The composition of claim 1 wherein the sulfide has the formula

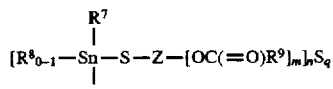

wherein $R^7$ is a hydrocarbyl radical; $R^8$ is a hydrocarbyl radical or —S—Z—[OC(=O)R$^9$]; Z is an alkylene or hydroxyalkylene radical of at least 2 carbon atoms; $R^9$ is hydrogen, a hydrocarbyl radical, a hydroxyhydrocarbyl radical, or $R^{10}C(=O)OR^{11}$, wherein $R^{10}$ is $(CH_2)_p$, phenylene, or —CH=CH—, and $R^{11}$ is a hydrocarbyl radical; m is an integer from 1 to 3, n is from 1 to 2, p is 0 or an integer from 1 to 8, q is from 1 to 10, and the valency of Z is m+1; with the proviso that it includes products arising from an equilibrium among the —SnR$^7$, —SnR$^8$, and —Sn—S—Z—[OC(=O)R$^9$] moieties, including oligomeric organotin sulfides.

5. The composition of claim 4 wherein $R^7$ and $R^8$ are alkyl groups having from 1 to 8 carbon atoms, Z is an alkylene radical having from 2 to 8 carbon atoms, $R^9$ is an alkyl radical having from 1 to 17 carbon atoms, n is 1, and q is from 1 to 4.

6. The composition of claim 4 wherein q is from 1 to 2.

7. The composition of claim 1 wherein stabilizer A comprises a mixture of organotin mercaptides of mercaptoalkyl carboxylates wherein y is 2 and y is 3 and the amount of mercaptides in which y is 2 is from about 70 to about 90% of the total weight of the mixture.

8. The composition of claim 2 wherein the amount of mercaptides in which y is 2 is from about 80 to about 85% of the total weight of the mixture.

9. The composition of claim 8 wherein $R^1$ is an alkyl group having from 1 to 4 carbon atoms, $R^2$ is an alkylene group having from 2 to 8 carbon atoms, $R^3$ is an alkyl group having from 1 to 17 carbon atoms or a phenyl group, and y is from 2 to 3.

* * * * *